(12) United States Patent
Rothman et al.

(10) Patent No.: US 9,262,178 B2
(45) Date of Patent: Feb. 16, 2016

(54) METHOD FOR REDUCING PLATFORM BOOT TIMES BY PROVIDING LAZY INPUT/OUTPUT ABSTRACTIONS

(71) Applicant: Intel Corporation, Santa Clara, CA (US)

(72) Inventors: Michael A. Rothman, Puyallup, WA (US); Vincent J. Zimmer, Federal Way, WA (US); Mark S. Doran, Olympia, WA (US); Michael D. Kinney, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 13/718,060

(22) Filed: Dec. 18, 2012

(65) Prior Publication Data

US 2013/0198502 A1    Aug. 1, 2013

Related U.S. Application Data

(60) Provisional application No. 61/592,269, filed on Jan. 30, 2012.

(51) Int. Cl.
*G06F 9/44* (2006.01)

(52) U.S. Cl.
CPC .................... *G06F 9/4406* (2013.01)

(58) Field of Classification Search
CPC ... G06F 9/4406; G06F 9/4401; G06F 9/4415; G06F 9/4408
USPC .................................................... 713/300, 2
See application file for complete search history.

(56) References Cited

U.S. PATENT DOCUMENTS

| | | | |
|---|---|---|---|
| 5,815,731 A | 9/1998 | Doyle | |
| 5,950,002 A * | 9/1999 | Hoford et al. | 717/109 |
| 6,434,696 B1 | 8/2002 | Kang | |
| 6,507,906 B1 * | 1/2003 | Criddle | G06F 9/4401 710/10 |
| 6,718,461 B1 | 4/2004 | Ewertz | |
| 6,721,885 B1 | 4/2004 | Freeman et al. | |
| 7,506,152 B2 * | 3/2009 | Park et al. | 713/100 |
| 7,533,274 B2 | 5/2009 | Freeman et al. | |
| 2004/0049560 A1 | 3/2004 | Zhou | |
| 2004/0093489 A1 * | 5/2004 | Hsu | 713/2 |
| 2006/0064600 A1 * | 3/2006 | Polichetti et al. | 713/183 |
| 2006/0294352 A1 * | 12/2006 | Morrison et al. | 713/1 |
| 2009/0172462 A1 * | 7/2009 | Rothman et al. | 714/2 |

(Continued)

OTHER PUBLICATIONS

International Searching Authority, "Notification of Transmittal of the International Search Report and the Written Opinion of the International Searching Authority," mailed May 15, 2013, in International application No. PCT/US2013/022856.

(Continued)

*Primary Examiner* — Chun Cao
*Assistant Examiner* — Chad Erdman
(74) *Attorney, Agent, or Firm* — Trop, Pruner & Hu, P.C.

(57) ABSTRACT

Methods, systems and computer program products are disclosed for enhanced system boot processing that is faster to launch an operating system, as certain devices such as user input hardware devices may not be initialized unless it is determined that a user-interruption to the boot process is likely. That is, although an interface for the devices is exposed, no initialization occurs unless a call to the interface occurs. Other embodiments are described and claimed.

19 Claims, 7 Drawing Sheets

(56) References Cited

U.S. PATENT DOCUMENTS

2011/0167463 A1* 7/2011 Walston .................. 725/111
2011/0302444 A1* 12/2011 Tashima ................... 714/2
2012/0159136 A1* 6/2012 Rothman et al. ............ 713/2
2013/0024678 A1* 1/2013 Yu ......................... 713/1

OTHER PUBLICATIONS

Korean Patent Office, Korean Office Action mailed Jun. 19, 2015, In Korean Patent Application No. 10-2014-7021299.
European Search Report, "Communication of extended European Search Report," mailed Aug. 19, 2015, in European Application 13743648.1-1954/2810158.

* cited by examiner

METHOD FOR REDUCING PLATFORM BOOT TIMES BY PROVIDING LAZY INPUT/OUTPUT ABSTRACTIONS

This application claims priority to U.S. Provisional Patent Application No. 61/592,269 filed on Jan. 30, 2012, which is hereby incorporated by reference.

BACKGROUND

Many computing systems have traditionally allowed a user to interrupt a boot process in order to perform various setup functions such as setting the system clock, managing memory settings, configuring a new hard drive, changing the boot order, password reset, etc. The interruption may be initiated by the user's activation of a particular keyboard button(s), such as delete, F1, F2, F10, or ctrl-alt-delete during basic input/output system (BIOS) boot processing. For such systems, the boot time may be significantly lengthened as input/output (I/O) devices, such as a universal serial bus (USB) keyboard, are enumerated and polled to determine if the user has indeed initiated such interruption.

DETAILED DESCRIPTION

Embodiments may be used to enable control of the interruptability of a platform without necessarily having to encounter the burden of polling of a particular input/output (I/O) device (e.g., a universal serial bus (USB) keyboard, which may take on the order of 0.5-1.5 seconds). As computing systems such as mobile devices, e.g., smartphones, tablet computers, Ultrabooks™, electronic readers and so forth become more prevalent, boot speed becomes more critical, as there exists a user desire for instant-on or near instant-on behavior. Nevertheless, there are contradicting requirements such as providing the ability to interrupt the boot process to enter certain pre-boot modes such as for setup or diagnostics, etc, which may be triggered by a user selecting a hot-key of some sort. To accommodate such operation, it can take up to ½ second simply to enumerate a bus to which a keyboard that accepts an interrupt is coupled. Further, some amount of wait time is provided for the user to press the key, which further exacerbates the boot time by introducing a scenario which causes a platform to constantly do something which significantly slows down the boot process, yet almost never is used.

Embodiments may controllably avoid this situation for the numerous boots in which no user input is provided, thus enabling a near instant on boot for the vast majority of system boots. According to various embodiments, pre-boot code such as a platform BIOS may support a lazy initialization (in other words, an on-demand initialization) of one or more hardware devices such as I/O devices.

Embodiments expose the standard interfaces that would normally be exposed had the hardware actually been initialized, but the initialization process is avoided. The hardware is only touched if the interface is called by a consumer and then (and only then) will the time associated with initializing the hardware actually be encountered.

Figure 1:
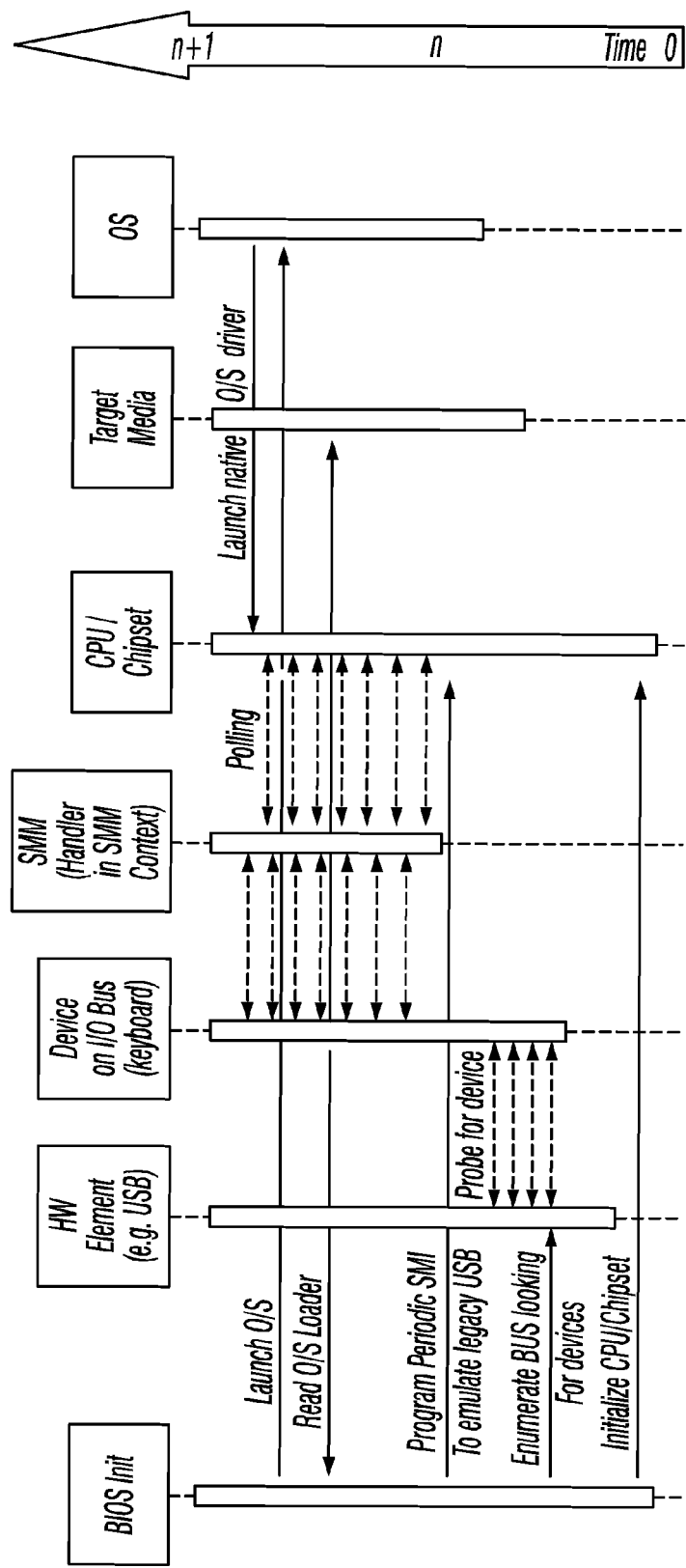
FIG. 1 is an illustration of operations performed prior to launching of an operating system.

Referring now to FIG. 1, shown is an illustration of conventional operations performed prior to launching of an operating system that incurs overhead for initializing hardware to poll for user inputs. As seen in FIG. 1, the steps to launching an operating system (OS) begin with BIOS initialization, which initializes a central processing unit (CPU)/chipset. Next, a bus such as an I/O bus is enumerated to look for devices. On this bus may be one or more hardware elements such as a USB controller that in turn interfaces to devices such as user input hardware devices, e.g., a keyboard. Examples of such user input devices, and more generally I/O devices, can include keyboard, mouse, numeric keypad, touchscreen, virtual keyboard displayed on a display screen, or the like.

As seen, a probing operation occurs between the hardware element and the device to probe for presence of the device. Next, a periodic system management interrupt (SMI) is programmed for periodic interruption to emulate legacy USB. As seen, interrupts can be generated in the CPU/chipset. Accordingly, polling operations occur that cause the CPU to enter into a system management mode (SMM) in which a handler can execute to thus poll for the presence of the device, e.g., keyboard, and also poll for user inputs. For example, I/O devices may be interrogated to determine whether the user has provided an input to indicate that a boot process is to be interrupted. They are thus monitored for user-initiated input. As one example, this interrogation involves establishing a handshake with the device and polling the device. Establishing the handshake may involve, for example, sending data of a particular format to a particular port.

Still referring to FIG. 1, next an OS loader is read from a target media such as a non-volatile storage of the system, e.g., a flash memory or a mass storage device such as a hard drive if present. BIOS then causes the OS to be launched. After launching of the OS, a native OS driver is launched. Note that due to the time delays associated with probing for the device and the polling operations, this boot process can take a longer time than desired.

Figure 2:
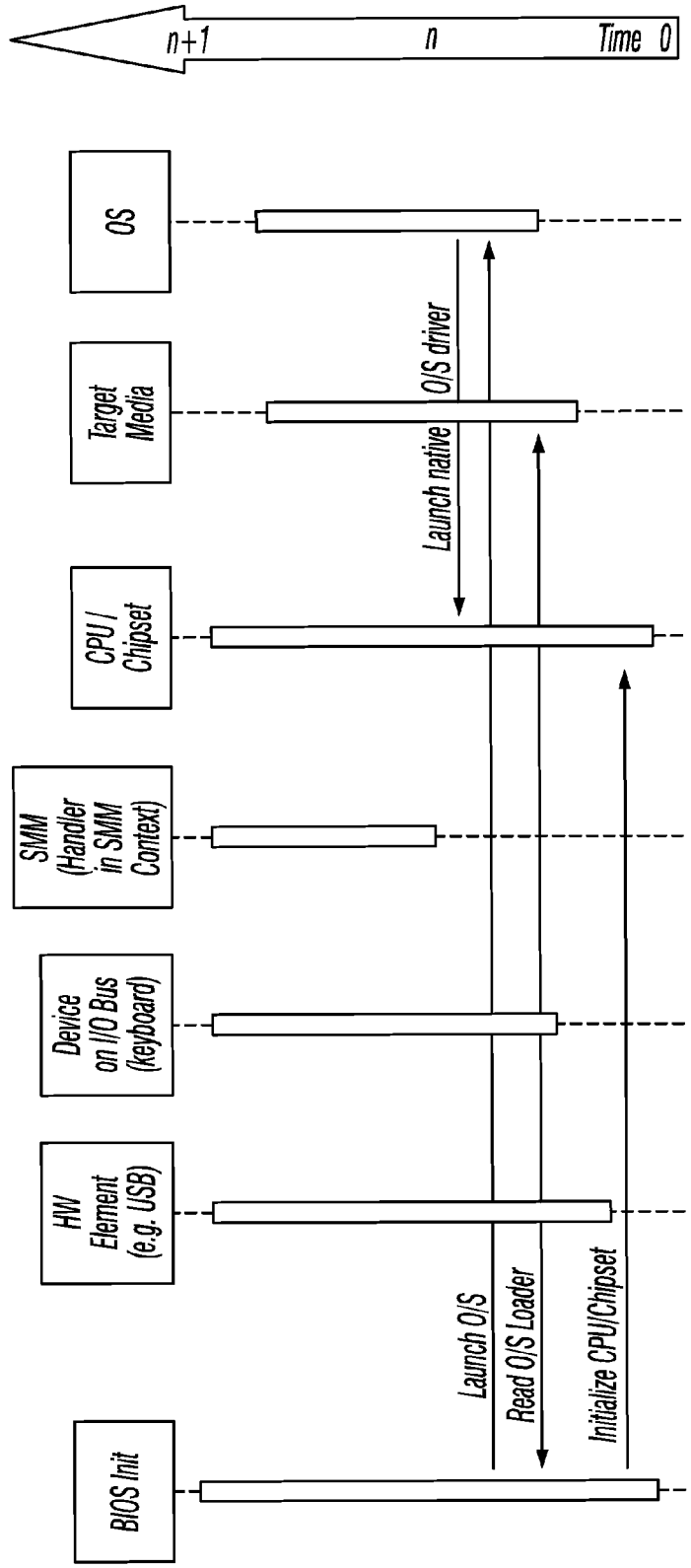
FIG. 2 is an illustration of operations performed prior to launching of an operating system in accordance with one embodiment of the present invention.

Instead according to certain embodiments, various overheads can be removed from the boot process prior to OS launch. Referring now to FIG. 2, shown is an illustration of operations performed prior to launching of an operating system in accordance with one embodiment of the present invention. As seen in FIG. 2, with the overheads removed, the time between initialization and launching of the OS can be much shorter. As seen, after initialization of the CPU/chipset, the OS loader is read directly thereafter, such that the OS can be directly launched, removing the overheads described above.

In this way, a perceived "instant on" or near "instant on" operation occurs, even when booting from a powered off platform. To achieve such perceived instant on operation, these overheads for probing of devices and polling for user input (which generally does not even occur) can be avoided. Nevertheless, there are valid product requirements for occasionally interrupting a boot process, e.g., to enter into a diagnostic mode or to allow user input to enter into a BIOS setup routine.

Figure 3:
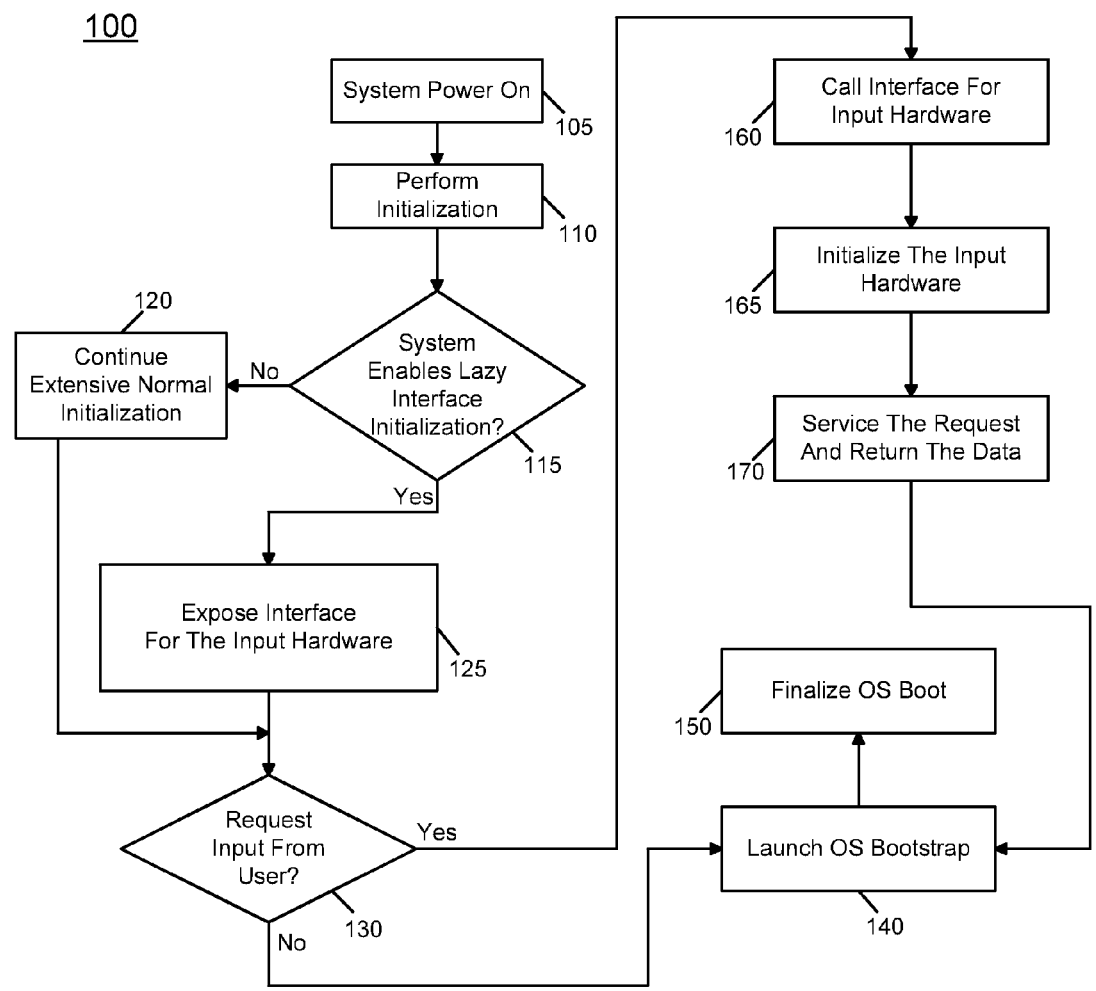
FIG. 3 is a flow diagram of a method for performing an enhanced boot in accordance with one embodiment of the present invention.

Referring now to FIG. 3, shown is a flow diagram of a method for performing an enhanced boot in accordance with one embodiment of the present invention. As shown in FIG. 3, method 100 may be implemented in firmware such as logic of BIOS. As seen, method 100 begins at system power on (block 105). Responsive to this power on of the system, an initialization can be performed (block 110). This initialization may trigger initialization of a CPU/chipset, discovery of memory, initialization of one or more buses, and possibly other certain low level hardware. In addition, execution of a pre-boot environment, e.g., a Unified Extensible Firmware Interface (UEFI) pre-boot environment can occur. As part of this pre-boot environment it can be determined at diamond 115 whether the system enables a lazy interface initialization. Although the scope of the present invention is not limited in this regard, in one embodiment this determination can be based on a BIOS setting that dictates whether an enhanced boot is to be enabled or disabled. Note that this configuration setting can be controlled by a user, OS, or other entity. If the system is not configured for such lazy interface initialization, control passes to block 120 where an extensive normal initialization may continue. As described above with regard to FIG. 1, this initialization may include activities with regard to enumeration and initialization of an I/O bus, hardware initializations, pollings and so forth.

Still referring to FIG. 3 from diamond 115 if it is determined that an enhanced boot is to occur, control passes to block 125 where an interface for the input hardware (e.g., a keyboard or other device) can be exposed. Note that this operation is a memory only operation and as such zero time occurs, as the actual initialization of the device is avoided, and only advertisement of the interface occurs. In one embodiment, this interface advertisement can be according to an UEFI simple text input protocol. Next, from both block 125 and diamond 115 control passes to diamond 130 where it can be determined whether an input is to be requested from a user. This determination can be based on a BIOS setting that indicates that the boot is to be interrupted. In one embodiment, this setting may be selected by a user during a previous power cycle of the platform to indicate whether the user seeks to interrupt a next boot of the system. If no such request of input occurs, control passes directly to block 140 where OS bootstrap code can be launched, which in one embodiment can be implemented via a boot manager. Accordingly, control passes to block 150 where the OS boot can be finalized.

Still referring to FIG. 3, if instead input is requested from the user, control passes to block 160 where an interface for the input device can be called. In one embodiment, this interface can be according to an UEFI simple text input protocol. Due to the calling of the previously exposed interface, control passes to block 165 where the input hardware can be initialized, e.g., according to a PS/2, USB or other protocol. Note that this initialization may occur in situations where the hardware has not been previously initialized (e.g., as done at block 120 where a conventional full boot process is instead selected).

Still referring to FIG. 3, control next passes to block 170 where the request can be serviced and the data returned. For example, in the context of a user keyboard input, a keyboard handler can be called to obtain the incoming key strokes from a keyboard buffer and return the data to the indicated location such as a BIOS routine that uses this data as an input. Control next passes to block 150 for launch of the OS bootstrap code as discussed above. Although shown at this high level in the embodiment of FIG. 3, understand the scope of the present invention is not limited in this regard.

Figure 4:
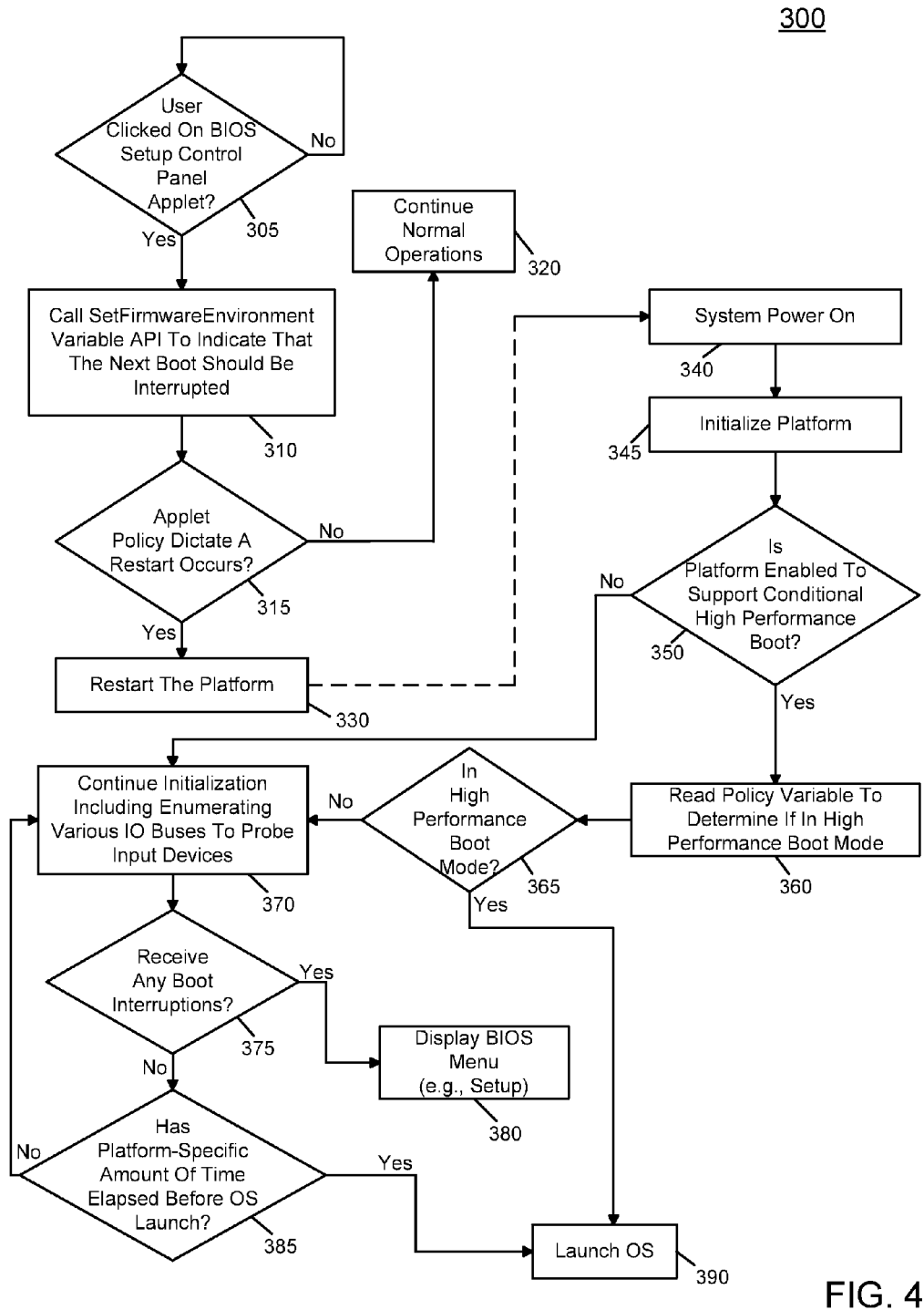
FIG. 4 is a flow diagram of operations performed in connection with enabling interrupt control of firmware and an enhanced boot in accordance with an embodiment of the present invention.

Referring now to FIG. 4, shown is a flow diagram of operations performed in connection with enabling interrupt control of firmware and an enhanced boot in accordance with an embodiment of the present invention. As shown in FIG. 4, the operations can be performed in part by OS-present logic and in part by BIOS logic. In general, the OS logic can be used to enable a user to configure a platform to enable a next boot up to be interrupted, e.g., to enable a diagnostic mode, user update of BIOS settings or so forth. In turn the BIOS logic can be used to perform an enhanced boot (also referred to as high performance boot mode) or a user-interrupted boot mode, depending on the settings.

As seen in FIG. 4, method 300 can begin by determining (at diamond 305) whether a user selects a BIOS setup control panel applet, which in one embodiment may be present in a control panel user interface of the OS. If so, control passes to block 310 where a particular application programming interface (API), e.g., a Set Firmware Environment Variable API, can be called to indicate that the next boot is to be interrupted. This setting information can be stored in a shared static variable location that is a common repository accessible to both OS and BIOS, which in one embodiment may act as a mailbox interface such that a setting selected using an OS can be later accessed by BIOS. Control then passes to diamond 315 where it can be determined whether an applet policy dictates that a restart should occur. If not, normal system operation may continue at block 320. Otherwise a platform restart may occur at block 330. Note that while the embodiment of FIG. 4 demonstrates use of an applet of a control panel program that allows the user to set one or more firmware environment variables (such as, e.g., a UEFI variable), in other embodiments the user input may be entered via a driver, applet or other software program separate from the operating system.

Still referring to FIG. 4, BIOS operations during boot based on such OS-provided settings can occur, either responsive to this platform restart or on a next boot up of the system. In either case, control passes to block 340 where the system may be powered on. Control then passes to block 345 where the platform can be initialized, e.g., as discussed above. Then at diamond 350 it can be determined whether the platform is enabled to support a conditional high performance boot. As described above, this conditional high performance boot may avoid the overhead of initializing certain hardware such as user interface hardware.

Still referring to FIG. 4, if the platform is so enabled, control passes to block 360 where the policy variable, which can be accessed from the static variable storage, can be read to determine if a high performance boot mode is selected. In other words, where no user interruption is to occur (or is not likely to occur), an enhanced boot in accordance with an embodiment of the present invention can be performed. This policy variable may in one embodiment be an indicator (such as a flag) to indicate whether a user interruption is expected or likely, meaning that a user is planning on interrupting the next boot for some reason. This variable can be stored in a commonly accessible storage location in the OS present environment. In one embodiment, this storage location may be any such shared memory location, in either volatile or non-volatile memory (NVM) such as a UEFI variable that is backed up by flash NVM.

If the boot is to be in the high performance mode with no user-initiated boot interruption (as determined at diamond 365), control passes directly to block 390 where the OS can be launched. Otherwise, control passes to block 370 (where control also passes if the platform is not enabled for a high performance or enhanced boot). At block 370 initialization may continue, which may include enumerating various I/O buses to probe (and thus initialize) input devices. Next it can be determined at diamond 375 whether any boot interruptions have been received. If so, an appropriate operation such as a given BIOS routine, e.g., a display routine to enable a display of a BIOS menu can be executed (block 380). In one embodiment this display may be of a diagnostics screen, a BIOS setup user interface menu or other display. The BIOS menu may include, for example, one or more of the following options: configure hardware; set the system clock, and/or set various password prompts, such as a password for securing access to the BIOS user interface functions itself and preventing malicious users from booting the system from unauthorized peripheral devices. Of course, responsive to this menu, a user can provide certain information such as configuration updates, clock updates, or so forth.

BIOS may then perform storage and updating of a configuration using this information. As this operation is a terminal state, e.g., by update to the BIOS setup menu, a restart of the machine occurs, and thus control may pass back to block 340 (not shown in FIG. 4 for ease of illustration).

Still referring to FIG. 4, if no boot interruptions are received at diamond 375, control passes to diamond 385, where it can be determined whether a platform-specific amount of time has elapsed before the OS launches. This predetermined amount of time may vary by platform, and may be based on, at least in part, a platform-specific maximum amount of time permitted to elapse for boot processing before the OS is launched. If not, control passes back to block 370. If the amount of time has elapsed, control passes to block 390 where the OS can be launched.

The figures discussed above illustrate embodiments wherein the default operation is an enhanced, faster boot process that does not interrogate I/O devices unless a user has selected to override the enhanced processing and instead to make the boot interruptible. However, one of skill in the art will recognize that default processing is a matter of policy and can easily be implemented in reverse. Thus, the selection of whether polling of I/O devices should be part of default boot processing is a matter of platform policy, and may vary for different embodiments. For alternative embodiments, the default boot operation is that the interrogation of I/O devices always occurs in order to provide for boot processing interruption, but that the user can elect, instead, to perform the faster, enhanced boot processing (e.g., no polling or interrogation of I/O devices) via user override processing.

Embodiments thus may be used to reduce boot times within BIOS by more than 25%, and to address the conflicting requirements of "instant-on" and boot interruptability. Such increases to the boot performance as the normal boot behavior helps even larger platforms which are intended to enter mission critical environments and have requirements to meet five 9's (99.999% up-time). Boot speed is a factor, as due to 99.999% up-time requirements, a platform can only be "down" for 5½ minutes or so per year. If a platform needs to re-boot, the faster that re-boot the better.

Figure 5:
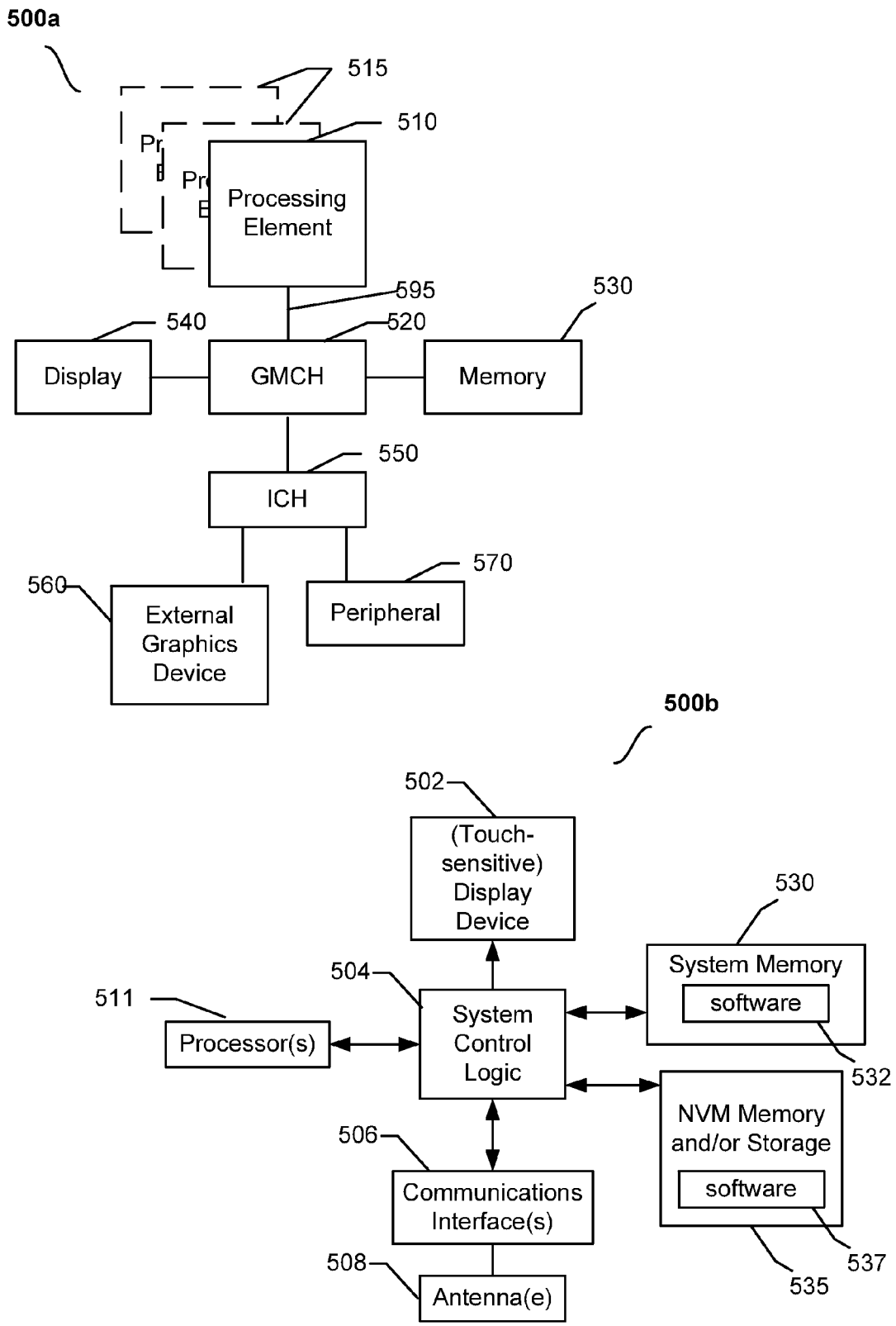
FIG. 5 is a block diagram illustrating first and second systems in accordance with at least one embodiment of the present invention.

Referring now to FIG. 5, shown are block diagrams of a first system 500*a* and a second system 500*b*, each of which may perform embodiments of the enhanced boot processing described above. As shown in FIG. 5, the first system 500*a* may include one or more processing elements 510, 515, which are coupled to graphics memory controller hub (GMCH) 520. The optional nature of additional processing elements 515 is denoted in FIG. 5 with broken lines.

Each processing element 510, 515 may be a single core or may, alternatively, include multiple cores. The processing elements 510, 515 may, optionally, include other on-die elements besides processing cores, such as integrated memory controller and/or integrated I/O control logic. Also, for at least one embodiment of the first system 500*a*, the core(s) of the processing elements 510, 515 may be multithreaded in that they may include more than one hardware thread context per core.

FIG. 5 illustrates that the GMCH 520 may be coupled to a memory 530 that may be, for example, a dynamic random access memory (DRAM). For at least one embodiment, the memory 530 may include code or instructions that comprise an operating system.

The GMCH 520 may be a chipset, or a portion of a chipset. The GMCH 520 may communicate with the processor(s) 510, 515 and control interaction between the processor(s) 510, 515 and memory 530. The GMCH 520 may also act as an accelerated bus interface between the processor(s) 510, 515 and other elements of the system 500*a*. For at least one embodiment, the GMCH 520 communicates with the processor(s) 510, 515 via a multi-drop bus, such as a frontside bus (FSB) 595. For other embodiments (see, e.g., FIGS. 6 and 7), the GMCH 520 communicates with the processors(s) 510, 515 via a point-to-point interconnect.

Furthermore, GMCH 520 is coupled to a display 540 (such as, e.g., a flat panel display or touch-sensitive display device). GMCH 520 may include an integrated graphics accelerator. GMCH 520 is further coupled to an input/output (I/O) controller hub (ICH) 550, which may be used to couple various peripheral devices to system 500*a*. Shown for example in the embodiment of FIG. 5 is an external graphics device 560, which may be a discrete graphics device, coupled to ICH 550, along with other peripheral device(s) 570, such as one or more keyboard, mouse, or numeric keypad.

Alternatively, additional or different processing elements may also be present in the first system 500*a*. For example, any of the features discussed immediately below in connection with the second system embodiment 500*b* may be included in the first system 500*a*. Also, additional processing element(s) 515 may include additional processors(s) that are the same as processor 510, additional processor(s) that are heterogeneous or asymmetric to processor 510, accelerators (such as, e.g., graphics accelerators or digital signal processing (DSP) units), field programmable gate arrays, or any other processing element. There can be a variety of differences between the physical resources 510, 515 in terms of a spectrum of metrics of merit including architectural, microarchitectural, thermal, power consumption characteristics, and the like. These differences may effectively manifest themselves as asymmetry and heterogeneity amongst the processing elements 510, 515. For at least one embodiment, the various processing elements 510, 515 may reside in the same die package.

FIG. 5 also illustrates that the second system 500*b* may include one or more processing elements 511. As with the first system 500*a* illustrated in FIG. 5, system 500*b* is an electronic device that may be implemented using any suitable hardware and/or software to configure electronic device 500*b* as desired. FIG. 5 illustrates, for one embodiment, an example system 500*b* includes a touch-sensitive display device 502, one or more processors 511, system control logic 504 coupled to at least one processor 511, system memory 530 coupled to system control logic 504, non-volatile memory and/or storage device(s) 535 coupled to system control logic 504, and one or more communications interfaces 506 coupled to system control logic 504.

Touch-sensitive display device 502 (also referred to herein as a "touchscreen") may be implemented using any suitable touch-sensitive technology such as, for example and without limitation, capacitive, resistive, surface acoustic wave (SAW), infrared, and optical imaging. The touch-sensitive technology used for touch-sensitive display device 502 for one embodiment may not require actual touching over its surface, but rather may sense the presence of an object near the surface. Such technology may nevertheless be considered touch-sensitive because such technology will similarly sense an object that actually touches over the surface of the display device 502 and because such surface is likely to be actually touched when electronic device 500b is used. Touch-sensitive display device 502 for one embodiment may be implemented using any suitable multi-touch technology. Touch-sensitive display device 502 includes a display that may be implemented using any suitable display technology, such as that for a liquid crystal display (LCD) for example. System control logic 430 for at least one embodiment may include one or more graphics controllers to provide one or more display interfaces to touch-sensitive display device 502.

System control logic 504 for at least one embodiment may include any suitable interface controllers to provide for any suitable interface to at least one processor 511 and/or to any suitable device or component in communication with system control logic 504.

System control logic 504 for at least one embodiment may include one or more memory controllers to provide an interface to system memory 530. System memory 530 may be used to load and store data and/or instructions, for example, for system 500b. For at least one embodiment, system memory 530 may be used to store any suitable software 532, such as any suitable driver software, application software, and/or operating system software. System memory 530 for one embodiment may include any suitable volatile memory, such as suitable dynamic random access memory (DRAM) for example.

System control logic 504 for at least one embodiment may include one or more input/output (I/O) controllers to provide an interface to touch-sensitive display device 502, non-volatile memory and/or storage device(s) 535, and communications interface(s) 506.

Non-volatile memory and/or storage device(s) 535 may be used to store data and/or instructions, for example. Non-volatile memory and/or storage device(s) 535 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example. Non-volatile memory and/or storage device(s) 535 may include, for at least one embodiment, non-volatile Read-Only Memory (ROM) that stores instructions 537 for BIOS processing.

Communications interface(s) 506 may provide an interface for system 500b to communicate over one or more networks and/or with any other suitable device. Communications interface(s) 506 may include any suitable hardware and/or firmware. Communications interface(s) 506 for one embodiment may include, for example, a network adapter, a wireless network adapter, a telephone modem, and/or a wireless modem. For wireless communications, communications interface(s) 506 for one embodiment may use one or more antennas 508.

System control logic 504 for at least one embodiment may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 511 may be packaged together with logic for one or more controllers of system control logic 504. For one embodiment, at least one processor 511 may be packaged together with logic for one or more controllers of system control logic 504 to form a System in Package (SiP). For one embodiment, at least one processor 511 may be integrated on the same die with logic for one or more controllers of system control logic 504. For one embodiment, at least one processor 511 may be integrated on the same die with logic for one or more controllers of system control logic 504 to form a System on Chip (SoC).

Although described for one embodiment as being used in system 500b, touch touch-sensitive display device 502 for other embodiments may be used in other system configurations.

Figure 6:
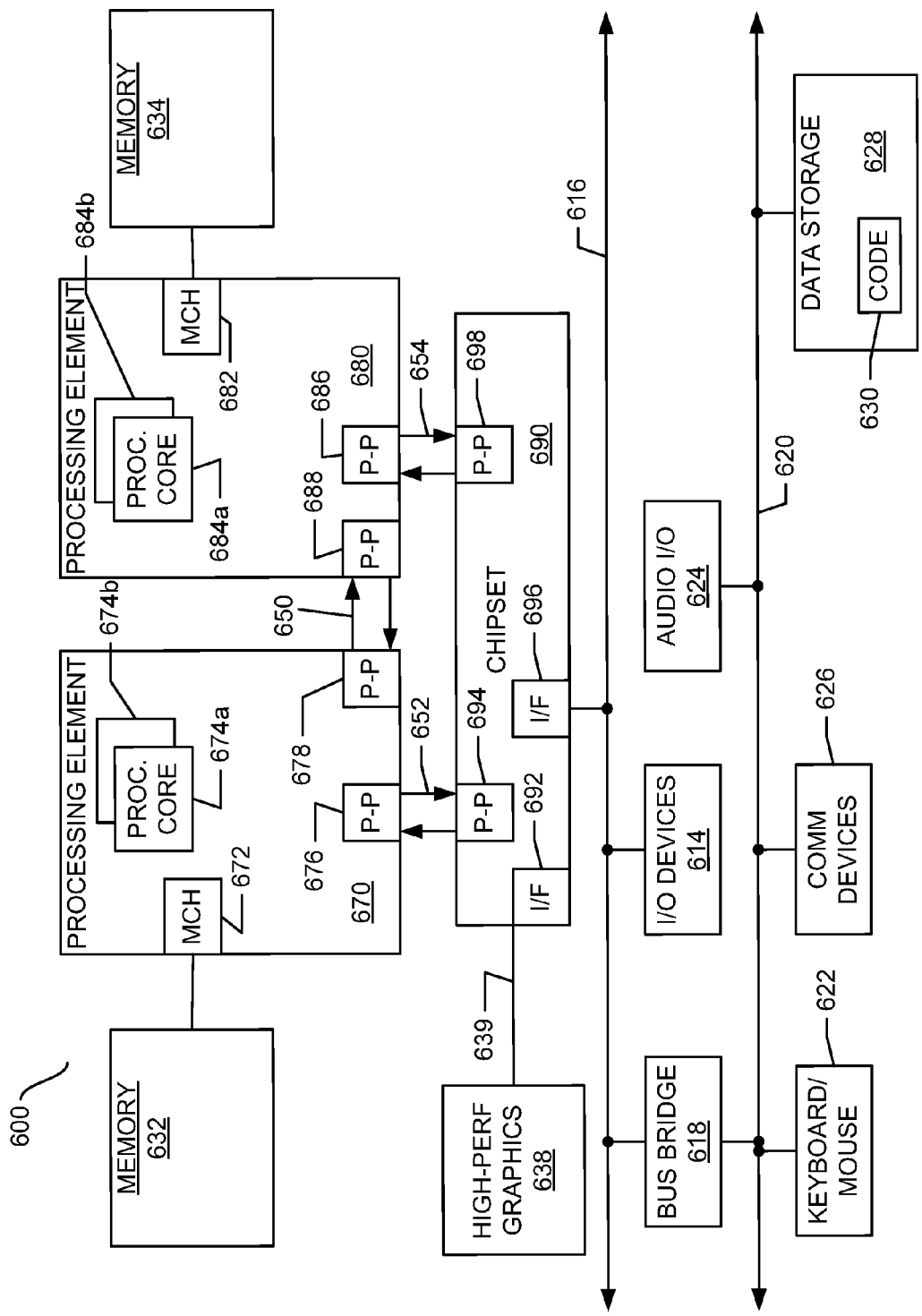
FIG. 6 is a block diagram of a system in accordance with at least one other embodiment of the present invention.

Referring now to FIG. 6, shown is a block diagram of a third system embodiment 600 in accordance with an embodiment of the present invention. As shown in FIG. 6, multiprocessor system 600 is a point-to-point interconnect system, and includes a first processing element 670 and a second processing element 680 coupled via a point-to-point interconnect 650. As shown in FIG. 6, each of processing elements 670 and 680 may be multicore processors, including first and second processor cores (i.e., processor cores 674a and 674b and processor cores 684a and 684b).

Alternatively, one or more of processing elements 670, 680 may be an element other than a processor, such as an accelerator or a field programmable gate array.

While shown with only two processing elements 670, 680, it is to be understood that the scope of the appended claims is not so limited. In other embodiments, one or more additional processing elements may be present in a given processor.

First processing element 670 may further include a memory controller hub (MCH) 672 and point-to-point (P-P) interfaces 676 and 678. Similarly, second processing element 680 may include a MCH 682 and P-P interfaces 686 and 688. As shown in FIG. 6, MCH's 672 and 682 couple the processors to respective memories, namely a memory 632 and a memory 634, which may be portions of main memory locally attached to the respective processors.

First processing element 670 and second processing element 680 may be coupled to a chipset 690 via P-P interconnects 652 and 654, respectively. As shown in FIG. 6, chipset 690 includes P-P interfaces 694 and 698. Furthermore, chipset 690 includes an interface 692 to couple chipset 690 with a high performance graphics engine 638. In one embodiment, bus 639 may be used to couple graphics engine 638 to chipset 690. Alternately, a point-to-point interconnect 639 may couple these components.

In turn, chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the appended claims are not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 626 and a data storage unit 628 such as a disk drive or other mass storage device which may include code 630, in one embodiment. The code 630 may include instructions for performing embodiments of one or more of the methods described above. Further, an audio I/O 624 may be coupled to second bus 620. Note that other architectures are possible. For example, instead of the point-to-point architecture of FIG. 6, a system may implement a multi-drop bus or another such architecture.

Figure 7:
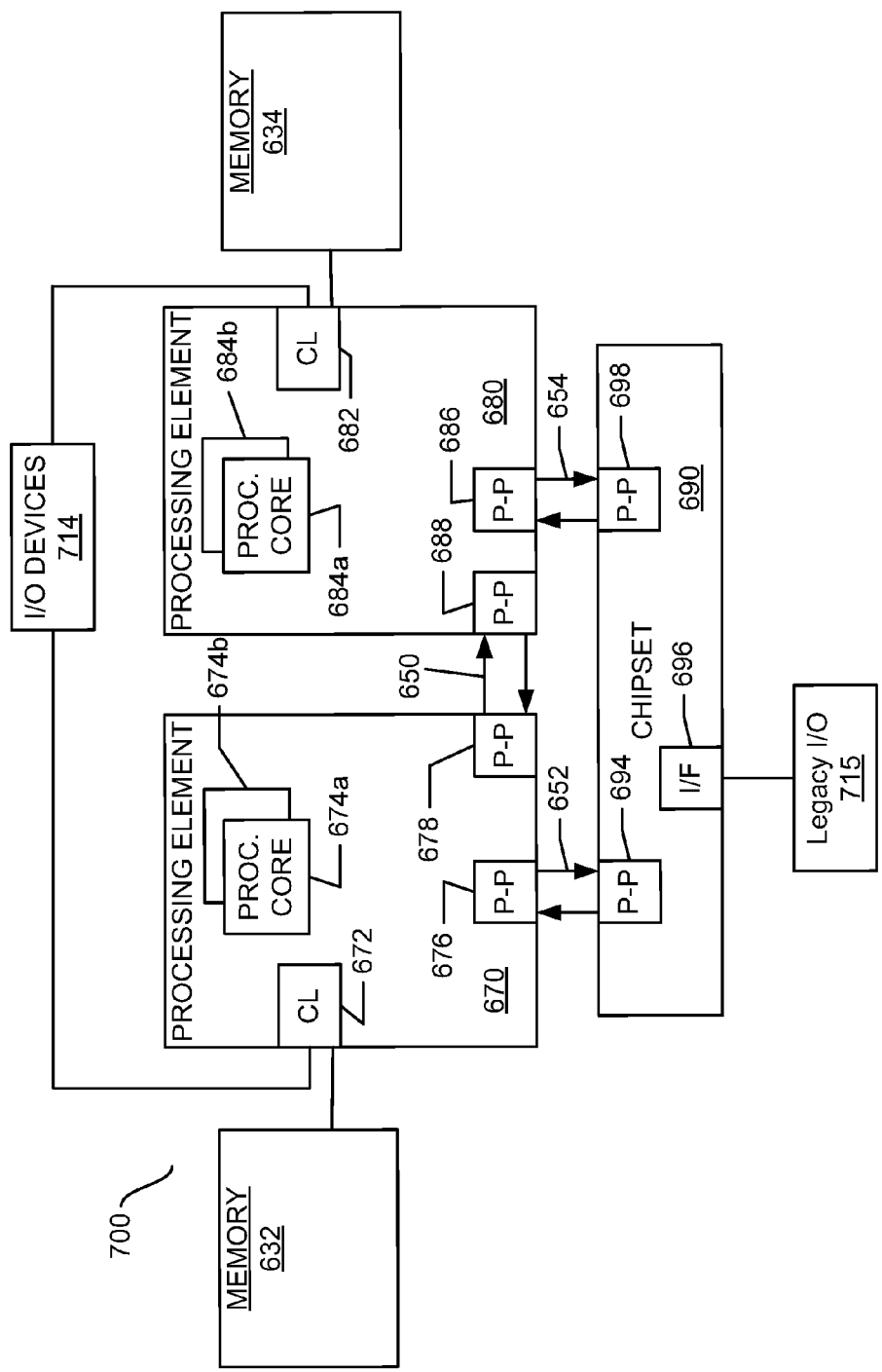
FIG. 7 is a block diagram of a system in accordance with at least one other embodiment of the present invention.

Referring now to FIG. 7, shown is a block diagram of a fourth system embodiment 700 in accordance with an embodiment of the present invention Like elements in FIGS. 6 and 7 bear like reference numerals and certain aspects of FIG. 6 have been omitted from FIG. 7 in order to avoid obscuring other aspects of FIG. 7.

FIG. 7 illustrates that the processing elements 670, 680 may include integrated memory and I/O control logic ("CL") 672 and 682, respectively. For at least one embodiment, the CL 672, 682 may include memory controller hub logic (MCH) such as that described above in connection with FIGS. 5 and 6. In addition. CL 672, 682 may also include I/O control logic. FIG. 7 illustrates that not only are the memories 632, 634 coupled to the CL 672, 682, but also that I/O devices 714 may also be coupled to the control logic 672, 682. Legacy I/O devices 715 may be coupled to the chipset 690.

Embodiments of the mechanisms disclosed herein may be implemented in hardware, software, firmware, or a combination of such implementation approaches. Embodiments may be implemented as computer programs executing on programmable systems comprising at least one processor, a data storage system (including volatile and/or non-volatile memory and/or storage elements), at least one input device, and at least one output device.

Program code, such as code 630 illustrated in FIG. 6, may be applied to input data to perform the functions described herein and generate output information. For example, program code 630 may include an operating system and/or BIOS that is coded to perform embodiments illustrated in FIGS. 3 and 4. Accordingly, embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of articles manufactured or formed by a machine or device, including non-transitory storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments. In one embodiment, a system includes a processor, at least one user input hardware device coupled to the processor, and a non-volatile storage to store pre-boot code including a first routine to perform an initialization of the processor, expose an interface for but not initialize the at least one user input hardware device based on a configuration of the system, and launch OS bootstrap code to launch an OS without initialization of the at least one user input hardware device.

In an embodiment, the system further includes a second storage to store an indicator to indicate that a next boot of the system is to be interrupted by a user input. The processor may access the indicator stored in the second storage, and initialize the at least one user input hardware device when the indicator indicates that the next boot of the system is to be interrupted. Further, the processor is to launch the OS bootstrap code after the initialization and after a predetermined time without receipt of a user input via the at least one user input hardware device. The pre-boot code may include a second routine to receive a configuration update via the at least one user input hardware device and to store the configuration update in a storage, and to thereafter cause the system to be restarted. The processor may directly launch the OS bootstrap code without initialization of the at least one user input device when the indicator indicates that the next boot of the system is not to be interrupted.

In another embodiment, a method includes: performing an initialization of a computer system to initialize a processor of the computer system; executing pre-boot code of the processor, including exposing an interface for a user input hardware device of the computer system but not initializing the user input hardware device, based on a configuration of the pre-boot code; and launching OS bootstrap code to launch an OS without initializing the user input hardware device.

The method may further include determining whether input from a user is requested prior to launching the OS bootstrap code, and if so, calling the interface for the user input hardware device. The user input hardware device may be initialized responsive to calling the interface. After initializing the user input hardware device, data may be obtained from the user input hardware device via a user interface handler, which can be provided to the pre-boot code. Determining whether input from the user is requested may include accessing a static variable that indicates whether a user interrupt is expected during execution of the pre-boot code. In an embodiment, the configuration of the pre-boot code is controlled by a user. The user may update a setting within the pre-boot code during a previous power cycle of the computer system to cause the user input hardware device to be initialized prior to launching the OS bootstrap code in a next power cycle of the computer system. An indicator may be stored in the computer system to indicate that a next boot of the computer system is to be interrupted by a user input, such that the method includes accessing the indicator during the next boot, and initializing the user input hardware device during the next boot when the indicator indicates that the next boot of the computer system is to be interrupted.

In another embodiment, at least one computer-readable medium includes instructions that when executed enable a computer system to: expose an interface for a user input hardware device of the computer system during a pre-boot environment but not initialize the user input hardware device, based on a configuration of the computer system; and launch OS bootstrap code to launch an OS in a boot environment of the computer system prior to initialization of the user input hardware device.

The medium may further include instructions that enable the computer system to directly launch the OS bootstrap code prior to initialization of the user input device when an indicator stored in a storage of the computer system indicates that a next boot of the computer system is not to be interrupted. The instructions also enable the computer system to access the indicator stored in the storage, initialize the user input hardware device when the indicator indicates that the next boot of the system is to be interrupted, and launch the OS bootstrap code after the initialization and after a predetermined time without receipt of a user input via the user input hardware device. The instructions also enable the computer system to receive a configuration update via the user input hardware device and to store the configuration update in a storage, and to thereafter cause the computer system to be restarted. And the instructions may also enable the computer system to call the interface to initialize the user input hardware device, and after initialization of the user input hardware device, obtain data corresponding to the configuration update from the user input hardware device via a user interface handler.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a processor;
at least one user input hardware device coupled to the processor;
a non-volatile storage to store pre-boot code including a first routine to perform processor initialization of the processor, expose an interface for but not initialize the at least one user input hardware device based on a configuration of the system and launch operating system (OS) bootstrap code to launch an OS without initialization of the at least one user input hardware device during a boot of the system; and
a second storage to store an indicator to indicate, based on a selection received from a user, whether a next boot of the system is to be interrupted by user input, wherein the processor is to directly launch the OS bootstrap code without initialization of the at least one user input device during the next boot of the system when the indicator indicates that the next boot of the system is not to be interrupted by the user input.

2. The system of claim 1, wherein the processor is to initialize the at least one user input hardware device when the indicator indicates that the next boot of the system is to be interrupted.

3. The system of claim 2, wherein the processor is to launch the OS bootstrap code after a device initialization of the at least one user input hardware device and after a predetermined time without receipt of the user input via the at least one user input hardware device.

4. The system of claim 2, wherein the pre-boot code includes a second routine to receive a configuration update from the user via the at least one user input hardware device and to store the configuration update in a storage, and to thereafter cause the system to be restarted.

5. A method comprising:
receiving a selection from a user during a boot process of a computer system, the selection to indicate, for a next boot process, one of to refrain from initialization of a user input hardware device of the computer system and to initialize the user input hardware device;
performing an initialization of a processor of the computer system during the next boot process; and
executing pre-boot code of the processor during the next boot process, including exposing an interface for the user input hardware device and launching operating system (OS) bootstrap code to launch an OS without initializing the user input hardware device when the selection indicates to refrain from initialization of the user input hardware device.

6. The method of claim 5, further comprising, when the selection indicates to initialize the user input hardware device, prior to launching the OS bootstrap code calling the interface for the user input hardware device.

7. The method of claim 6, further comprising initializing the user input hardware device responsive to calling the interface.

8. The method of claim 7, further comprising after initializing the user input hardware device, obtaining data from the user input hardware device via a user interface handler.

9. The method of claim 8, further comprising providing the data to the pre-boot code.

10. The method of claim 5, further comprising storing an indicator in the computer system based on the selection to indicate whether the next boot process of the computer system is to be interrupted by a user input, accessing the indicator during the next boot process, and initializing the user input hardware device during the next boot process when the indicator indicates that the next boot process of the computer system is to be interrupted.

11. At least one non-transitory computer-readable medium including instructions that when executed enable a computer system to:
expose an interface for a user input hardware device of the computer system during a pre-boot environment of a next power cycle but not initialize the user input hardware device, based on a configuration of the computer system that is to be determined based on a user selection received by the computer system in a previous power cycle; and
based at least in part on the configuration of the computer system, launch operating system (OS) bootstrap code to launch an OS in a boot environment of the computer system in the next power cycle prior to initialization of the user input hardware device.

12. The at least one non-transitory computer-readable medium of claim 11, further comprising instructions that enable the computer system to directly launch the OS bootstrap code prior to initialization of the user input device when an indicator that is based on the user selection and stored in a storage of the computer system indicates that a next boot of the computer system is not to be interrupted.

13. The at least one non-transitory computer-readable medium of claim 12, further comprising instructions that enable the computer system to access the indicator stored in the storage, initialize the user input hardware device when the indicator indicates that the next boot of the system is to be interrupted, and launch the OS bootstrap code after the initialization and after a predetermined time without receipt of a user input via the user input hardware device.

14. The at least one non-transitory computer-readable medium of claim 11, further comprising instructions that enable the computer system to receive a configuration update via the user input hardware device and to store the configuration update in a storage, and to thereafter cause the computer system to be restarted.

15. The at least one non-transitory computer-readable medium of claim 14, further comprising instructions that enable the computer system to call the interface to initialize the user input hardware device, and after initialization of the user input hardware device, obtain data corresponding to the configuration update from the user input hardware device via a user interface handler.

16. The system of claim 1, wherein responsive to the selection that indicates that the next boot of the system is not to be interrupted by the user input, the processor is to directly launch the OS bootstrap code without prior initialization of a plurality of user input hardware devices coupled to the processor.

17. The system of claim 4, wherein the configuration update is to include an update of the indication of whether the next boot of the system is to be interrupted by the user input.

18. The method of claim 7, further comprising launching the OS bootstrap code after initializing the user input hardware device and after a predetermined time without receipt of a user input via the user input hardware device.

19. The system of claim 8, wherein obtaining the data includes polling the user input hardware device for user input via the user interface handler.

\* \* \* \* \*